United States Patent [19]

Borden

[11] Patent Number: 4,544,052

[45] Date of Patent: Oct. 1, 1985

[54] RESETTABLE DISCONNECT DEVICE FOR ROTATING MACHINES

[75] Inventor: Raymond W. Borden, Farmingdale, N.J.

[73] Assignee: Allied Corporation, Morris Township, Morris County, N.J.

[21] Appl. No.: 588,626

[22] Filed: Mar. 12, 1984

[51] Int. Cl.⁴ .................... F16D 7/02; F16D 23/00; F16D 43/20

[52] U.S. Cl. .................................. 192/56 R; 464/30

[58] Field of Search ............. 192/56 R, 56 L; 464/35, 464/36, 37, 30

[56] References Cited

U.S. PATENT DOCUMENTS

| | | | |
|---|---|---|---|
| 4,386,689 | 6/1983 | Kato | 192/56 R |
| 4,467,663 | 8/1984 | van der Lely | 192/56 F X |
| 4,496,136 | 1/1985 | Maeda | 192/56 R |

Primary Examiner—Edward G. Favors
Attorney, Agent, or Firm—Stanley N. Protigal

[57] ABSTRACT

A disconnection coupling (11) is provided for installation between the input shaft (41) of an accessory and an engine to which the accessory is mounted. An input member (20) of the coupling (11) is connected to the engine in lieu of the accessory's input shaft (41). This provides engine power to the input member which can be selectively transferred to the accessory's input shaft. An intermediate member (30) is rotationally connected to an output member (40) which, in turn, receives the accessory's input shaft (41). The intermediate member (30) is able to be axially displaced with respect to the output member (40), while a spline joint (35) maintains the rotational connection between the intermediate and output members (30, 40). A release ring (47) and a braking spring (55) cooperate to cause a sleeve (57) to apply braking force and to axially displace the intermediate member (30) in order to disconnect the curvic coupling (29) and consequently disengage the accessory's input shaft (41) from the input member (20). When the release ring (47) is moved to a position to allow connection of the curvic coupling (29), a solenoid (69) normally latches the release ring (47) in that position.

18 Claims, 3 Drawing Figures

RESETTABLE DISCONNECT DEVICE FOR ROTATING MACHINES

BACKGROUND OF THE INVENTION

This invention relates to rotary connections and apparatus to disconnect and reconnect such rotary connections. In particular, the invention relates to apparatus for remotely disconnecting and for manually reconnecting a rotary drive shaft, such as those used to drive accessories powered by an engine.

In various applications, a powered device such as a generator is driven by a drive shaft from an engine. In many cases, failure of such a powered device can be detected in time to avoid significant damage to the device if the device is disconnected. Similarly, a large accessory can cause damage to an engine, should the large accessory seize during the operation of the engine. In such cases, the provision of a disconnect device is cost-justified.

In aircraft, generator systems are provided with redundancy of operation, either by providing battery power in the case of single engine aircraft or, in the case of multi-engine aircraft, by providing multiple generators which provide a significant margin of safety. In certain aircraft such as those used in electronic and weather information gathering, it may be desired to fly the aircraft for extended periods of time. If, for example, a generator on the aircraft fails, the aircraft may have more than ample power to continue on its mission with more available electric power than would be necessary to meet any safety requirements for the aircraft. In such cases, a failed generator driven by one of the main engines of the aircraft may be disconnected, allowing the engine in the aircraft to continue without the interference of the generator. In the prior art, this disconnect feature had either been unavailable or had been effected by a frangible member. While such frangible members are expensive, they tend to be economical when compared to the expense of repairing other equipment which may be damaged or even when compared to the expense of prematurely aborting a mission.

In many cases, a warning of a imminent failure may be caused by non-failure-related events, such as a transient overload or a false signal. In the event that the generator or other accessory may be safely eliminated for the duration of a flight, a pilot may choose to disconnect the accessory for purely economic reasons, provided that the disconnection itself does not involve costly replacements. Furthermore, there may be other cases in which it may be desired to give the pilot an ability to elect to continue operation of a generator or other accessory, even with a failed part, because the needs of a particular operation outweigh the economic considerations.

For these reasons, it is desired to provide a disconnect device which may be selectively or automatically operated remotely. It is further desired that a disconnect device be provided in which the disconnect device can be reused by merely resetting the disconnect device. It is further desired that a means be provided to disconnect a device driven by a rotary shaft in which divers and remote signals can be used to effect disconnection. It is further desired that such a remotely operated disconnect device be able to be used in order to facilitate economical disconnection of the driven device.

It is further desired to provide a resettable disconnect device which must be actively reset by a mechanic in order that the mechanic cannot overlook the occurrence of a malfunction of the driven device. It is further desired that equipment, such as an aircraft engine powering such a driven device be able to be properly operated without the use of such a driven device until such time as repairs can be conveniently effected.

It is a further object of the invention to provide such a disconnect device for a rotating drive system in which one of the members, such as the driven member, can be braked after disconnection.

SUMMARY OF THE INVENTION

In accordance with the present invention, a rotary coupling includes an input member which may be connected to an input shaft, an output member, which may be connected to a driven shaft and an intermediate assembly, slideably connected to the output member and engageable with the input member in order to effect a rotational connection between the input and output members. The connection of the intermediate assembly with the input member is controlled by a release ring which rotates in order to allow the intermediate assembly to engage or disengage with the input member. A coil spring is connected to the release ring and is caused to frictionally engage the intermediate assembly in such a way as to brake the output member through the intermediate assembly when the release ring has caused the intermediate assembly to withdraw from its connection with the input member.

In the preferred embodiment, the release ring is biased toward a released and braked state and is retained in an engaged state by a normally latched solenoid. When the solenoid is activated, the release ring disengages the intermediate member from the input member and allows the braking spring to apply braking pressure which is transferred to the output member. Upon release, a reset rod is caused to extend from device's housing, thereby flagging the released condition. In order to reconnect the output member to the input member, the release rod must be pushed back toward the housing, a procedure which alerts maintenance personnel to a possible malfunction whether or not that malfunction has been squawked. Advantages include an ability to quickly and electively disconnect and brake a driven device by means of an electrical signal, and an ability to disconnect a driven device in flight without a destruction of a component.

DETAILED DESCRIPTION OF THE PREFERRED EMBODIMENT

Figure 1:
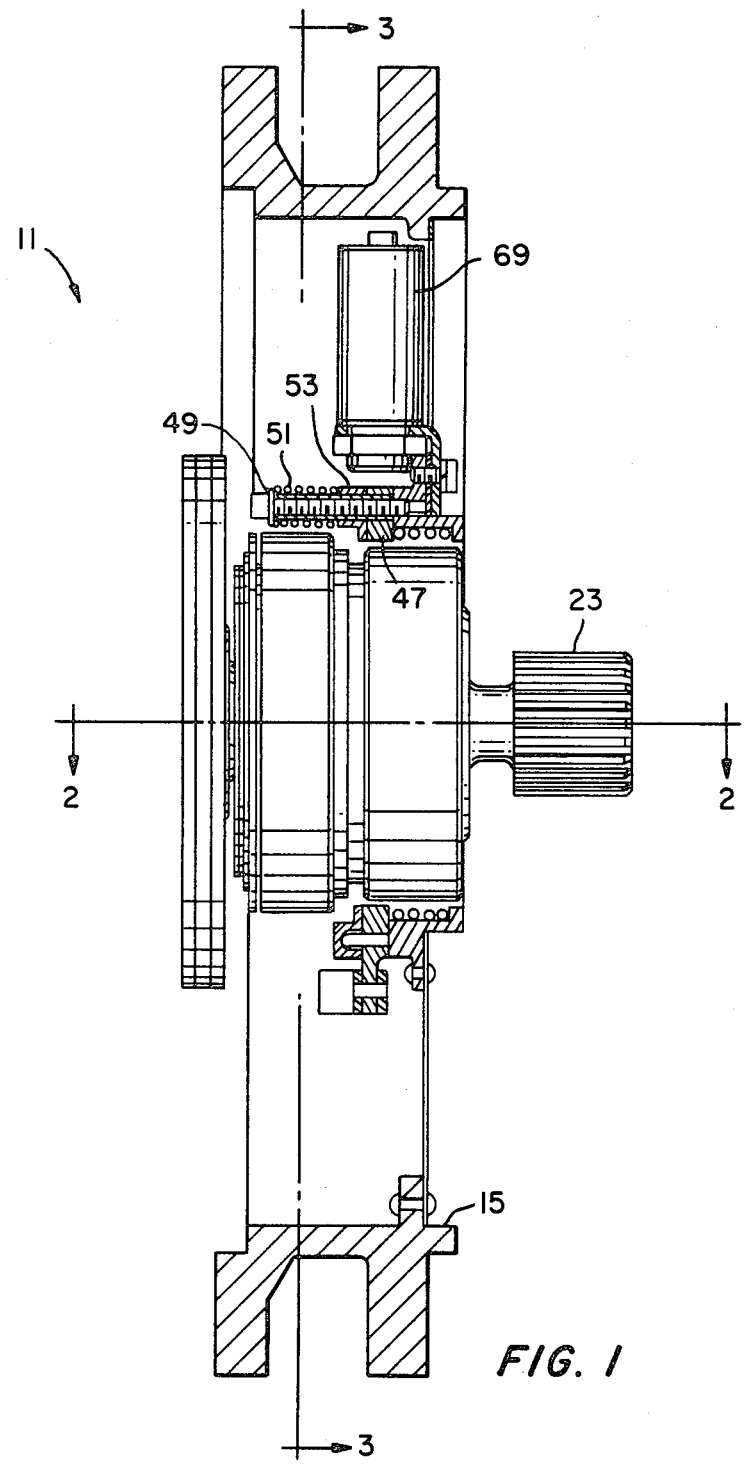
FIG. 1 is a side cross-sectional view of a disconnect device for a rotary drive system constructed in accordance with a preferred embodiment of the invention.

As can be seen in FIG. 1, a disconnection coupling 11 is mounted to an accessory device, such as a generator (not shown) at a mounting flange 13 so that a housing 15 of the disconnection coupling 11 is rotationally fixed with respect to the accessory's housing. Power to the accessory is provided by mounting the coupling 11 to a source of power such as an aircraft engine (not shown)

at a power take-off point. An input member 20 is connected to the power take-off point by means of spline teeth 23 which mate with corresponding splines on the engine at the engine's power take-off point.

Figure 2:
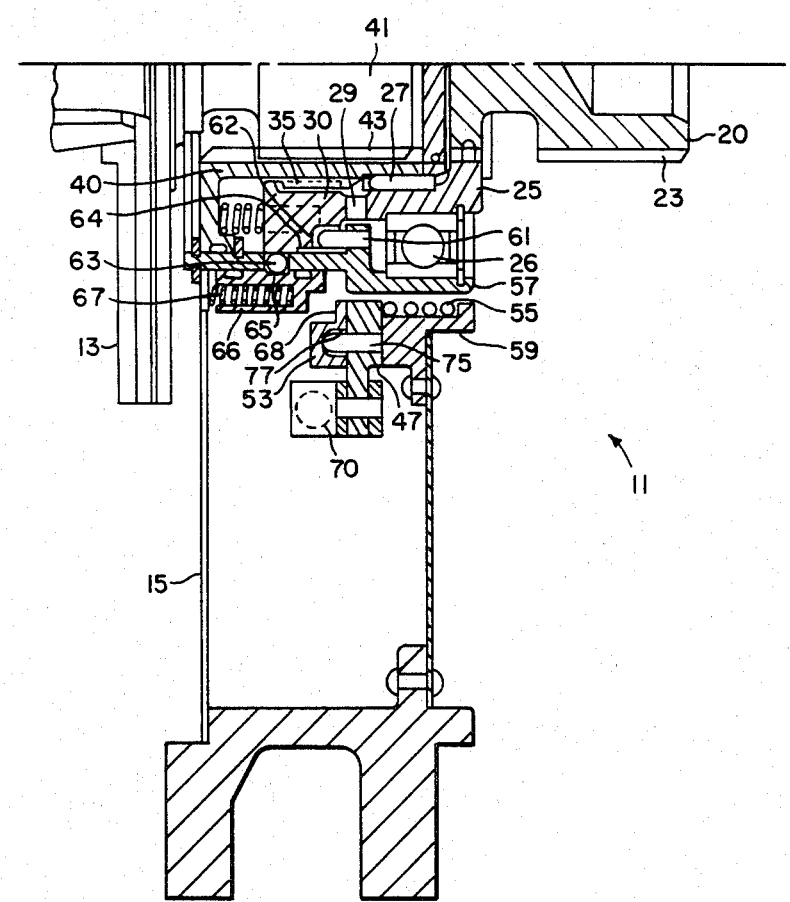
FIG. 2 is a cross-sectional view, showing details of gear and brake assemblies used in the disconnect device of FIG. 1.

Referring to FIG. 2, the input member 20 extends into the housing 15 and includes a flange 25 within the housing 15. The flange 25 rides between ball bearings 26 and roller bearings 27. The input member 20 terminates with a curvic coupling 29, in which teeth on the input member 20 mate with corresponding teeth on an intermediate member 30. The intermediate member 30 slides along an intermediate spline joint 35, in which a second set of teeth on the intermediate member 30 mate with teeth on an output member 40. The output member 40 receives an input shaft 41 associated with the accessory. In the preferred embodiment, the input shaft 41 to the accessory corresponds to the input shaft 20 of the coupling 11, so that the coupling 11 can be optionally installed on the equipment carrying the accessory. The input shaft 41 is rotationally locked with the output member 40 by means of a spline coupling 43.

The intermediate member 30 is able to slide in an axial direction against the output member 40 along the intermediate spline joint 35, while remaining rotationally locked to the output member 40. In so sliding, the input member 20 becomes disengaged from the intermediate member 30 at the curvic coupling 29, permitting relative rotational movement between the intermediate member 30 and the input member 20 when the curvic coupling 29 is disengaged. The intermediate spline joint 35 maintains intermediate member 30 rotationally engaged with the output member 40. The output member 40, in turn, remains rotationally engaged with the input shaft 41. Thus, it may be seen that the actual disengagement of the input member 20 from the output member 40 is effected by movement of the intermediate member 30, the separation being effected at the curvic coupling 29.

Figure 3:
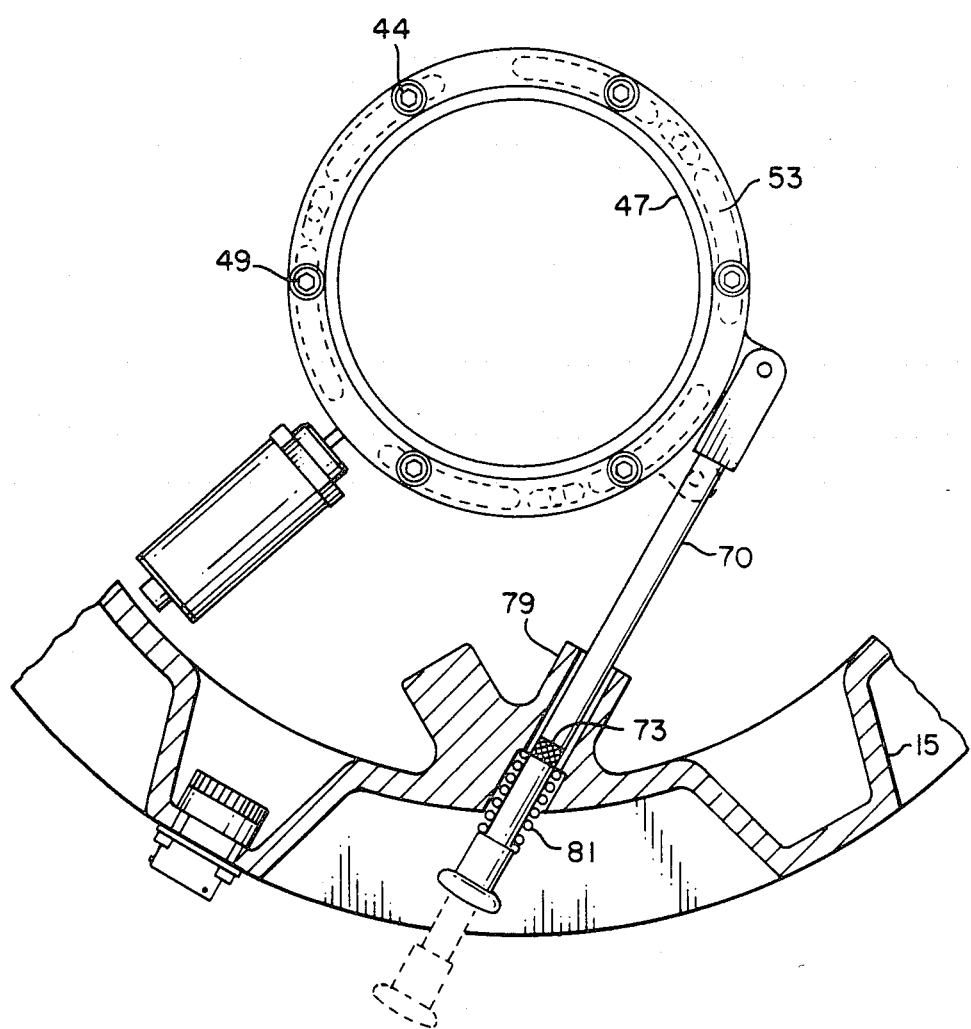
FIG. 3 is an axial cross-sectional view of the disconnect device of FIG. 1, taken along lines 2—2 of FIG. 1.

Movement of the intermediate member 30 is initiated after a release ring 47, shown in FIGS. 1 and 3, is rotated from an "engage" position (as shown in FIG. 2) to a "disengage" position. A plurality of retainer screws 49 cooperate with the housing 15 to support the release ring 47. The retainer screws 49 are also used to support the retainer springs 51, which bias a detent ring 53 against the release ring 47.

As shown in FIG. 2, a braking spring 55 extends along the outside of a brake sleeve 57 and is connected to the release ring 47 and to an OD rest 59 which is fixed to the housing 15. In its relaxed state, braking spring 55 has an inside diameter which is less than the outside diameter of the brake sleeve 57, and therefore, if relaxed, the braking spring 55 will rub against the brake sleeve 57. As will be seen, the release ring 47 is rotated to effect axial movement of the inter- mediate member 30, thereby connecting or disconnecting the input member 20 and the output member 40. When the release ring 47 is allowed to freely rotate, the braking spring 55 will bias the release ring 47 to rotate in a released direction, thereby relaxing the braking spring 55 and causing the braking spring 55 to frictionally contact the brake sleeve 57.

The brake sleeve 57 is restrained in its rotational movement with respect to the intermediate member 30. Since the brake sleeve 57 is rotationally linked to the intermediate member 30, the braking spring 55 rubbing against the brake sleeve 57 effects a retarding force which is transferred to the input shaft 41, thereby braking the input shaft 41 when the curvic coupling 29 has been disengaged. This results in essentially two steady-state modes of operation for the disconnection coupling 11. In a normal or engaged state, the input member 20 is engaged with the input shaft 41 and the braking action of the braking spring 55 against the brake sleeve 57 is not present. In a disengaged mode of operation, the input member 20 is disconnected from the input shaft 41 and the braking spring 55 is effecting braking action through the brake sleeve 57.

When the release ring 47 is rotated to the "disengage" position, the brake spring 55 is released against the brake sleeve 57 and the resulting friction causes the brake sleeve 57 to resist rotation. Rotational force of the intermediate member 30 is transferred through the brake sleeve 57 through a plurality of ramping pins 61 which are fixed to the brake sleeve 57 and ride against ramps 62 on the intermediate member 30. The friction of the braking spring 55 against the brake sleeve 57 urges the brake sleeve 57 to resist rotation with the intermediate member 30 and consequentially causes the pins 61 to ramp against the intermediate member 30. Since the intermediate member 30 is axially displaceable, the intermediate member 30 thereby moves, thus causing the curvic coupling 29 to disconnect. The displacement of the intermediate member 30 with respect to the brake sleeve 57 allows a plurality of detent balls 63, housed in the brake sleeve 57, to engage corresponding detents 64 in the intermediate member 30 until such time as the disconnection coupling 11 is cocked into the connected mode. The detent balls 63 rest against a cavity 65 in a locking sleeve 66. The locking sleeve 66 is in an axially sliding relationship with the intermediate member 30 and is biased by springs 67 to move the cavity 65 away from the balls 63.

Movement of the locking sleeve 66 shifts the cavity 65 away from the detent balls 63. This displaces the balls 63 into the detents 64 in the intermediate member 30, and locks the intermediate member 30 in a disconnected position until the disconnection coupling 11 is cocked into the connected mode. This is important because, after the brake spring 55 has caused the accessory's input shaft 41 to stop rotating, the brake sleeve 57 is no longer urging the relative motion between the brake sleeve 57 and the intermediate member 30.

Referring to FIGS. 1 and 2, the release ring 47 has a ramping surface 68 which displaces the locking sleeve 66 against springs 67 when the release ring 47 is turned to the "engage" position. This displacement of the locking sleeve 66 aligns the cavity 65 with the detent balls 63, thus allowing the intermediate member 30 to move into toward the input member 20, thereby engaging the curvic coupling 29.

The release ring 47 is biased by the braking spring 55 to the "disengage" position in which the braking spring 55 relaxes, engages the brake sleeve 57, and causes the disconnection coupling 11 to go to the disconnect mode. In order to prevent such rotation, a solenoid 69 normally engages the relese ring 47 to prevent rotational movement of the release spring 47 from the "engage" position. The solenoid 69 is activated to release the release ring 47, thereby allowing the release ring 47 to rotate as urged by the braking spring 55, which in turn causes the ramping of the intermediate member 30 away from the input member 20. Referring to FIG. 3, the rotational movement of the release ring 47 causes a reset rod 70 to radially move with respect to the housing 15. When the release ring 47 rotates to its position in the disconnect mode, the release rod 70 is extended out of the housing 15, as shown in phantom. A contrasting color indicator band 73 is applied onto the rod 70 so that the color band 73 is exposed when the rod 70 is extended. The extension of the rod 70, as well as the visibility of the color band 73 provides a positive indication of the disconnection coupling 11 being in the disconnect mode.

Referring to FIG. 1 and 2, the detent ring 53 is retained in rotationally fixed position with respect to the housing 15 by three retainer screws 49 and is biased against a release ring 47 by the retainer springs 51. A series of pins 75 engage detent notches 77 in the detent ring 53 in order to retain the release ring 47 in a release position. This detent is most important when, in the disconnect mode and after the accessory's input shaft 41 has stopped rotating, the brake sleeve 57 is no longer rotating against the braking spring 55.

OPERATION

After installation of the coupling 11 between the engine and the engine's accessory, the accessory is engaged with the engine by pressing the reset rod 70 inward toward the housing 15 until the color band 73 is no longer visible and the solenoid 69, in its relaxed state, latches the release ring 47. This cocks the coupling 11 by rotating the release ring 47 into the "engage" position. The detent notches 77 in the detent ring 53 may provide an additional positive locking feel. Upon rotation of the release ring 47, the braking spring 55 is wound outwardly against the OD rest 59 and the intermediate member 30 moves toward the input member 20 until the curvic coupling 29 is engaged. The detent balls 63 drop into the cavity 65 in the locking sleeve 66 so as to permit the curvic coupling 29 to slide into its engaged state.

When it is desired to change over to a disconnected mode, an electrical signal is provided to the solenoid 69 causing the solenoid 69 to withdraw its pin from the release ring 47. At that time, the braking spring 55 and any other cooperating biasing forces cause the release ring 47 to rotate until the braking spring 55 engages the brake sleeve 57. When the brake sleeve 57 is engaged by the braking spring 55, the release ring 47 continues until the detent pins 73 reach the detent notches on the detent ring 53, thus maintaining the release ring 47 in a fully disconnected state.

With the braking spring 55 pressing against the brake sleeve 57, a rotational force exists between the brake sleeve 57 and the intermediate member 30 as long as the output member 40 is turning. This causes the brake sleeve 57 to rotationally displace against the intermediate member 30 and pins 61 to ramp against ramps 62. This ramping action causes the intermediate member 30 to move away from the input member 20, thus disengaging the curvic coupling 29. The detent balls 63 engage the detents 64 in the intermediate member 30, thereby latching the curvic coupling 29 disengaged. After the accessory's input shaft 41 has ceased to rotate, as a result of its own friction and as a result of the braking force applied by braking spring 55 to the brake sleeve 57, the detent balls 63 prevent the intermediate member 30 from sliding toward the input member 20, thus preventing damage to the curvic coupling 29, which would otherwise occur from the intermediate member 30 clattering against the input member 20.

As a result of the release ring 47 rotating, the reset rod 70 is extended and the color band 73 appears. The extension of the reset rod 70, combined with the appearance of the color band 73 may be visible to a line mechanic who is servicing the engine. The accessory's problem will also hopefully will have been squawked by the pilot. If the disconnection remains unnoticed until the next flight, the pilot on the next flight will, of course, notice that the accessory on that engine is inoperative and will have a chance to further squawk the problem. In any event, further failure or damage is avoided because, as long as the reset rod 70 is extended, the accessory remains disconnected.

It is possible to provide various modification to the preferred embodiment described. For example, it is possible to have the solenoid 69 mounted in such a way that certain rotational forces cause the solenoid 69 to rotate and therefore allow the release ring 47 to automatically rotate. It is also possible to use other means for controlling the various components, such as by substituting a manually-operated cable (not shown) for the solenoid 69. Referring to FIG. 3, it is possible to readily adapt the disconnection coupling 11 for use with an accessory designed to be driven in an opposite direction. In such a case, the release rod's mounting boss 79 would be drilled in a different direction and the braking spring 55 be wound in an opposite direction, with detents and ramps being properly positioned. The parameters of the brake spring 55 are controlled by the braking force desired to be applied to the accessory and the force necessary to separate the curvic coupling 29. It is possible to provide additional biasing to the release ring 47, for example, by adding a spring 81 to the release rod 69 as shown in FIG. 3. While the coupling 11 has been described as an independent unit which is separable from the driven accessory, the accessory's input shaft 41 can be combined with the output member. It is also possible to fabricate the coupling as a part of the accessory. These and other modifications to the preferred embodiment being possible, it is desired to limit the scope of this invention only by the claims.

What is claimed is:

1. Apparatus for a rotary drive train in which a driving unit transfers power to a driven unit by means of a rotating drive connection, on the driving unit, powered by the driving unit, characterized by:
    (a) an input member adapted to fit the drive connection on the driving unit;
    (b) an output member;
    (c) an intermediate member displaceable with respect to the input member and the output member;
    (d) a first coupling on the intermediate member for transferring rotary movement of the first member to rotary movement of the intermediate member and a second coupling on the intermediate member for transferring rotary movement of the intermediate member to rotary movement of the output member, one of the first and second couplings being releasable and the other of said couplings remaining engaged;
    (e) release means having a disengage position and an engage position, the release means being biased toward the disengage position;
    (f) latch means to retain the release means in the engage position, the latch means being selectively releasable;
    (g) means to release said releasable coupling in response to the release means moving to the disengage position; and (h) means to engage said releasable coupling in response to the release means moving to the engage position.

2. Apparatus as described in claim 1, further characterized by:
the intermediate member being coaxial with the input member and the output member and being axially displaceable with respect to the input member and the output member.

3. Apparatus as described in claim 2, further characterized by:
said coupling remaining engaged being a spline coupling; and the intermediate member being slideable along said spline coupling in order to be displaced with respect to the input and output members, the displacement effecting release and engagement of said releasable coupling.

4. Apparatus as described in claim 3, further characterized by:
(a) the spline coupling being the second coupling, and the first coupling being a releasable coupling; and
(b) the release means further providing a braking force to the intermediate member when the release means is in the disengage position.

5. Apparatus as described in claim 1, further characterized by:
the biasing means effecting force upon a ramp, the ramp causing the intermediate member to be displaced, displacement of the intermediate member controlling the state of release of said releasable coupling.

6. Apparatus as described in claim 5, further characterized by:
the biasing means effecting force upon a ramp, the ramp causing the intermediate member to be displaced, displacement of the intermediate member controlling the state of release of said releasable coupling.

7. Apparatus for a rotary drive train in which a driving unit transfers power to a driven unit by means of a rotating drive connection, on the driving unit, powered by the driving unit, characterized by:
(a) an input member adapted to fit the drive connection on the driving unit;
(b) an output member;
(c) an intermediate member displaceable with respect to the input member and the output member;
(d) a first coupling on the intermediate member for transferring rotary movement of the first member to rotary movement of the intermediate member and a second coupling on the intermediate member for transferring rotary movement of the intermediate member to rotary movement of the output member, one of the first and second couplings being releasable and the other coupling remaining engaged;
(e) release means having a disengage position and an engage position;
(f) brake means responsive to the release means to apply a retarding force to the output member, the application of the brake means further urging said releasable coupling to release.

8. Apparatus as described in claim 7, further characterized by:
the release means being biased toward the released position.

9. Apparatus as described in claim 7, further characterized by:
the application of the brake causing the retarding force to further urge said releasable coupling to release.

10. Apparatus as described in claim 8, further characterized by:
the application of the brake causing the retarding force to further urge said releasable coupling to release.

11. Apparatus as described in claim 7, further characterized by;
the brake means biasing the release means into one of said positions.

12. Apparatus as described in claim 9, further characterized by:
the brake means biasing the release means into one of said positions.

13. Apparatus as described in claim 10, further characterized by:
the brake means biasing the release means into one of said positions.

14. Apparatus as described in claim 8, further characterized by:
(a) a housing:
(b) a latch connecting the release means to the housing; and
(c) means to unlatch the latch in order to allow the release means to move to one of said positions.

15. Apparatus as described in claim 14, further characterized by:
the latch being a solenoid which, in its normal state, remains biased in a latched condition.

16. Apparatus for a rotary drive train in which a driving unit transfers power to a driven unit by means of a rotating drive connection, on the driving unit, powered by the driving unit, characterized by:
(a) an input member adapted to fit the drive connection on the driving unit;
(b) an output member;
(c) an intermediate member, coaxial with the input member and the output member, the intermediate member being axially displaceable with respect to the input and output members;
(d) a spline coupling on the intermediate member, connecting the intermediate member with the output member, the intermediate member being axially displaceable along the spline coupling, while remaining rotationally engaged with the output member;
(e) a disengageable coupling between the input member and the output member, arranged so that the disengageable coupling can be alternately engaged or disengaged by displacing the intermediate member in an axial direction along the spline coupling;
(f) a release ring;
(g) a brake including a first part controlled by the release ring and a part which is rotable with the intermediate member;
(h) a linkage connecting the rotatable part with the intermediate member, the linkage causing the intermediate member to be displaced along the spline coupling so as to disengage the disengageable coupling in response to braking force applied by the brake, the linkage further transferring a retarding force to the output member when the braking force is applied;
(i) means to retain the disengageable coupling in engagement when the braking force is not being applied.

17. Apparatus as described in claim 16, further characterized by:

the brake means biasing the release means into one of said positions.

18. Apparatus as described in claim 16, further characterized by:

the output member being the input shaft of the driven unit.

* * * * *